Jan. 22, 1957

L. F. DASSE 2,778,452

SELF-ADJUSTING DISC BRAKE

Filed April 7, 1955

INVENTOR.
L. F. Dasse
BY Robert Cobb
Attorneys.

Jan. 22, 1957  L. F. DASSE  2,778,452
SELF-ADJUSTING DISC BRAKE

Filed April 7, 1955  4 Sheets-Sheet 4

INVENTOR.
L. F. Dasse
BY
Robb & Robb
Attorneys.

United States Patent Office 2,778,452
Patented Jan. 22, 1957

2,778,452

SELF-ADJUSTING DISC BRAKE

Lester F. Dasse, St. Joseph, Mich., assignor, by mesne assignments, to Lambert Brake Corporation, St. Joseph, Mich., a corporation of Michigan Application April 7, 1955, Serial No. 499,830

8 Claims. (Cl. 188—72)

The present invention relates to self-adjusting disc brakes, and more particularly to a self-adjusting disc brake employing axially disposed self-adjusting means.

Simple and efficient automatic adjusting means have heretofore been associated with disc brakes of the type which are primarily adapted for use in combination with a self-energization principle, where the self-adjusting means are mounted for response to the rotative movement of the energizing discs. In the present invention, the self-adjusting principle is employed independent of any rotative movement of the brake operating members.

One of the objects of this invention is to provide a self-adjusting brake particularly adapted to aircraft braking, where the braking area is required to absorb high energy, thus necessitating the utilization of a multiplicity of braking surfaces, employing axial thrust means for primary actuation, and incorporating axial type self-adjusting means readily adaptable to a multiple disc brake of this type, as distinguished from self-adjusting means mounted for response to rotative movement of the brake operating means.

Another object of this invention is to provide a multiple disc brake with an automatically operable one-way locking screw adjusting means mounted in an axial plane for more positive automatic compensation for lining wear and greater efficiency than any previous type axial self-adjusting means known to the art.

Still another object is to provide a self-adjusting multiple disc brake including a pair of relatively fixed plates, an actuator disc or plate disposed adjacent to one of said pair of plates, friction discs disposed between the actuator plate and the other of said pair of plates, actuator means between the actuator plate and the adjacent plate of said pair of plates for shifting the actuator plate in a direction towards the other of said pair of plates to engage the friction discs therebetween, and automatic adjuster means for limiting movement of the actuator plate in the oppostie direction. This adjuster means preferably includes a one-way shiftable member interengageable with said plates so as to maintain a predetermined spaced relation between the actuator plate and the plate at the opposite side of the friction discs in proportion to the combined thickness of the friction discs. With this type of adjuster, a predetermined brake release clearance is maintained regardless of the amount of wear of the friction discs.

When such self-adjusting brakes are utilized on aircraft or in other installations where central hydraulic power systems are employed for brake actuation, as well as for actuation of other hydraulically operated devices, the brakes utilize a consistent non-varying amount of pressure fluid during actuation. Such a non-varying fluid requirement permits the use of lighter, less intricate and less costly central power systems, by eliminating the necessity of special valves and associated fluid lines and the like to control the available fluid in the central power system.

A further object is to provide a disc brake having automatic adjuster means, the brake including a plurality of disc and plate members disposed in coaxially aligned, axially spaced relation, and the adjuster means having the form of a one-way shiftable member carried by one of the disc or plate members and extended axially with respect to the disc and plate members, but in no way interfering with relative rotation of the disc and plate members. By virtue of this arrangement, the adjuster means is especially useful in such a brake when the brake is provided with camming means between certain of the disc and plate members for effecting a powerful self-energization of the brake as the result of torque-responsive relative rotation of the latter disc and plate members. However, while a brake according to the preceding objective is preferably provided with such energizing means, the aforementioned self-adjuster means are equally useful in a brake which is not provided with self-energizing means, because the one-way shiftable member is directly responsive to axial thrust. Moreover, from the standpoint of casting and machining, the provision of a screw-supporting boss and screw end-engaging surfaces on the opposed radially extended faces of the plates is materially simplified in a brake having the one-way shiftable member disposed in an axial direction, as compared with previously known automatically adjusting brakes.

Other objects and advantages of the invention will be hereinafter described, and the novel features thereof will be defined in the appended claims.

Figure 1:
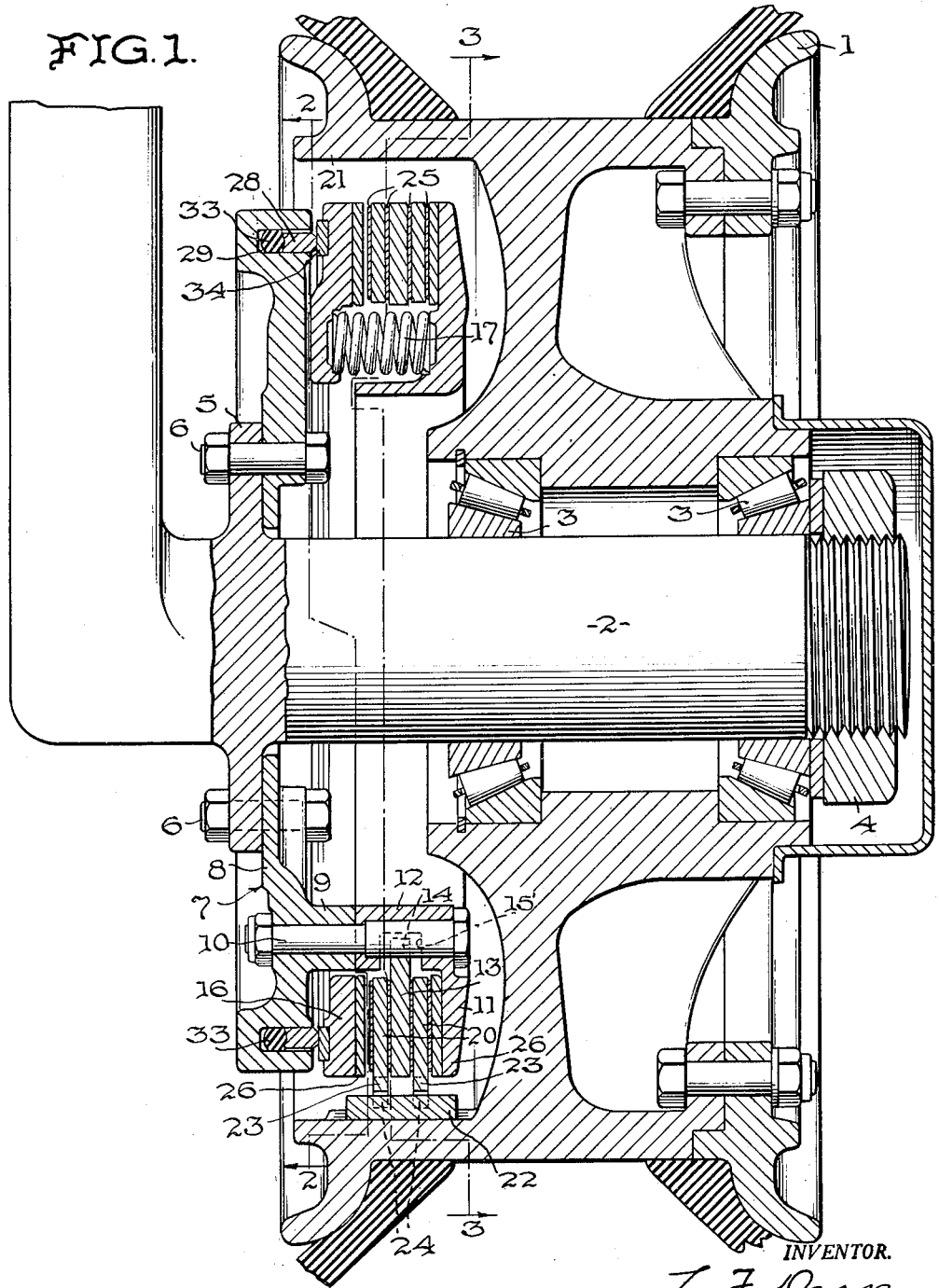
Fig. 1 is a view in diametrical vertical section of an aircraft wheel brake embodying the invention.

Like reference characters in the several figures of the drawings and in the specification designate corresponding parts, wherein 1 generally denotes a wheel of a type ordinarily utilized in the landing gear of aircraft. It is to be understood, however, that my invention is not limited to airplane wheel brakes, since it is equally well adapted to other vehicle wheels, as well as to friction devices in general for transmitting or absorbing torque.

According to the arrangement and construction of the brake assembly which will be hereinafter described in detail, and which is shown in the drawings for illustrative purposes only, the wheel 1 is suitably mounted upon a rigid supporting axle 2, as by means of a pair of roller bearings 3, 3 interposed between the wheel hub and the axle, the wheel 1 being retained on the axle 2 as by means of a nut 4 in a conventional manner.

At a position spaced from the free end of the axle 2, it is preferably integrally formed with a radially extended supporting flange 5, to which is rigidly connected, as by means of a suitable number of bolts 6, a relatively stationary sub-assembly generally designated 7. This relatively stationary sub-assembly 7 includes a so-called brake power plate 8 which is connected to the flange 5 by the bolt 6 and is in the form of an annular member concentrically disposed about the axle 2. Disposed in equidistant circumferentially spaced relation about the plate 8 and projecting laterally therefrom at positions intermediate the inner and outer peripheries of the plate 8 are a suitable number of bosses 9, and a secondary brake plate 11 is connected to the plate 8, as by means of bolts 10 or the like. The plate 11 is annular in form and spaced about its inner periphery is a suitable number of laterally projecting bosses or projections 12 which are adapted for abutting engagement with the bosses 9 on plate 8, with the screws 10 extending through openings in the respective bosses 9 and 12, to secure the plates 8 and 11 together in rigid axially spaced relation.

Also forming a part of the relatively stationary sub-assembly 7 is a friction disc or plate 13 in the form of an annular member encircling the bosses 12 on the plate 11 so as to be supported and centralized on the bosses 12. In order to so support the disc or plate 13, the inner periphery of this plate or disc is provided with a suitable number of radially inwardly extended ears 14 which are each provided with an arcuate notch 15 at their inner extremities, these ears 14 projecting into suitable cutouts 15' in the respective bosses 12 for supporting engagement of the bolts 10 in the notches 15 in the ears. The cutouts 15' are of such a size as to permit axial sliding movement of the disc or plate 13, and it will be understood that, while only one such disc or plate 13 is shown in the illustrated brake, a plurality of such discs or plates may be utilized, as will hereinafter more fully appear.

A further component of the relatively stationary sub-assembly 7 is a primary actuator plate 16 which is disposed adjacent to the plate 8 and is in the form of an annular member concentrically disposed about the bosses 9 of the plate 8, so as to be free for axial shifting movements relative to the plates 8 and 11, and preferably, so as to be free for slight rotative movement relative to these plates.

Disposed in equidistantly spaced relation and interposed between the actuator plate 16 and the secondary plate 11 adjacent to their inner peripheries is a plurality of brake release springs 17 in the form of coiled compression springs which tend to urge the actuator plate 16 axially towards the power plate 8. The illustrated brake is preferably adapted for self-energization, and accordingly, a plurality of hardened balls 18 are interposed between the plates 8 and 16, these balls 18 being disposed in oppositely inclined ramp seats 19, 19' formed in the opposing faces of the plates 8 and 16, respectively. Thus, the actuator plate 16 is centralized relative to the plate 8 by the balls 18, and the springs 17 normally maintain the plate 16 in engagement with the balls, so that the plate 16 is virtually supported on plate 8 by the balls 18. However, in a non-energizing brake, where no such camming balls and seats are provided, any other suitable means may be provided for supporting the actuator disc or plate 16 for axial movement relative to the plate 8.

Interleaved between the plates 16, 13 and 11 of the relatively stationary sub-assembly 7 is a pair of rotors 20 which are adapted to be operatively connected to the wheel 1 for rotation therewith. In order to so connect the rotors 20 to the wheel 1, the inner periphery of the wheel rim 21 is preferably provided with a suitable number of axially extended and circumferentially spaced keys 22, and the outer periphery of each of the rotors 20 is preferably provided with a corresponding number of radially extended ears 23 which are notched as at 24 for engagement with the keys 22, whereby the rotors 20 are keyed to wheel 1 for rotation therewith, while being free for axial shifting movements. The rotors 20 are in the form of annular discs or plates, and on their respective opposite faces, each rotor 20 is provided with arcuate segments 25 of friction lining material which is suitably secured to the rotors 20, as by bonding or the like.

The rotors 20 are disposed at the respective opposite sides of the stator 13, so that one of the rotors 20 is disposed adjacent to the actuating disc or plate 16, while the other rotor 20 is disposed adjacent to the plate 11. It will be understood, however, that the number of stators used may be multiplied, as previously mentioned, and for each additional stator, an additional rotor would be utilized. The opposed faces of the plates 11 and 16 which are disposed adjacent to the respective rotors 20 are each preferably provided with arcuate lining segments 26 which are suitably secured to the respective plates 11 and 16 as by means of screws, rivets or the like, as at 27.

Figure 7:
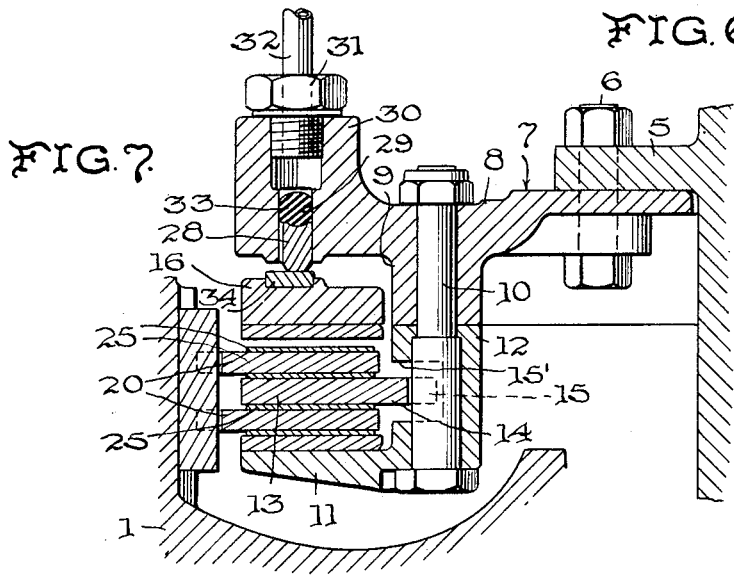
Fig. 7 is a fragmentary view in section and on an enlarged scale, as taken on the line 7—7 of Fig. 2.

Now it will be seen that the discs or plates 13 and 20 constitute a pack of interleaved friction discs, which, upon frictional engagement with each other and with the plates 16 and 11, will effect braking of the wheel 1, by transmitting torque from the rotors 20 to the entire relatively stationary sub-assembly 7 which is fixedly mounted upon the axle 2. In order to effect such frictional engagement of the friction discs 13 and 20, actuator means are provided for shifting the actuator disc 16 toward the secondary disc or plate 11, so as to press the friction discs 13 and 20 therebetween. In the illustrative embodiment, such actuator means are disclosed as including an annular actuator piston 28 which is shiftably mounted in an annular actuator cylinder 29 formed in the power plate 8 adjacent to its outer periphery. At diametrically opposite positions, the power plate 8 is formed with a pair of outstanding bosses 30, one of which is specifically shown in section in Fig. 7 as having mounted therein a connector 31 for a fluid line 32 which is adapted to be connected with a suitable source of operating fluid, such as the conventional hydraulic actuator system with which most present day aircraft are provided or with which other types of wheeled vehicles are normally provided. The other of the bosses 30 would preferably be plugged, but is provided for the purpose of permitting identical power plates 8 to be manufactured for use on either side of an airplane or other wheeled vehicle. Interposed in the annular actuator cylinder 29 for the purpose of preventing leakage of actuator fluid supplied to the actuator cylinder through the line 32, there is an annular seal 33.

In the usage of a brake as hereinbefore described for absorbing relatively high torque loads, substantial heat is generated by frictional engagement of the friction discs, and therefore, an insulating ring 34 is preferably interposed between the outer end of the annular piston 28 and the adjacent face of the actuator disc 16. This insulating ring 34 will prevent the transmission of heat from the actuator disc 16 to the actuating fluid in the annular actuator cylinder 29, thus assuring the operation of the brake under high temperature conditions created by the high degree of heat generated thereby.

Figure 3:
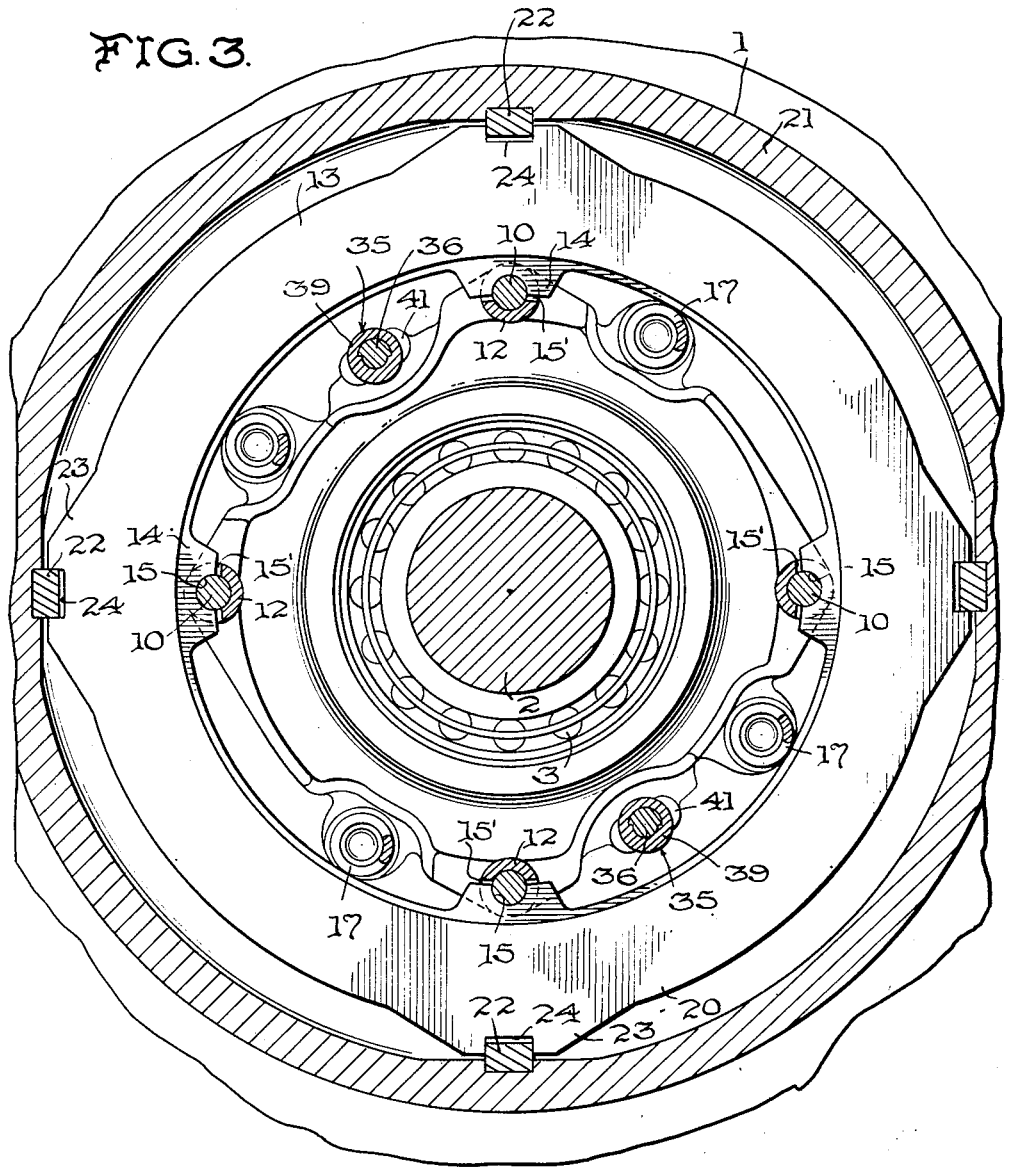
Fig. 3 is a view in vertical section and on a slightly reduced scale, as taken on the line 3—3 of Fig. 1, showing particularly the means for connecting certain of the friction discs to the aircraft wheel and to a fixed portion of the brake, respectively.
Figure 4:
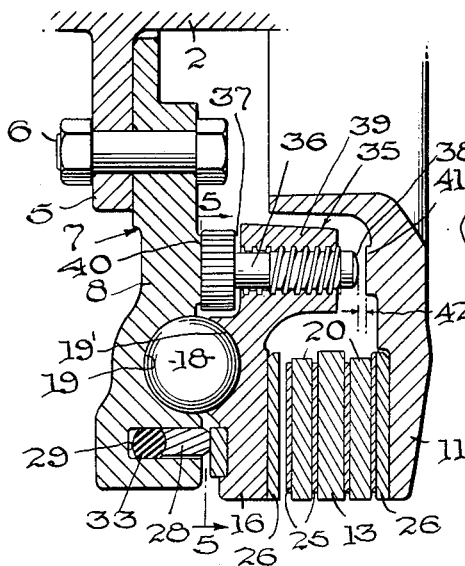
Fig. 4 is a fragmentary sectional view on an enlarged scale, as taken on the line 4—4 of Fig. 2, and particularly illustrating the automatic adjuster means for the brake.
Figure 5:
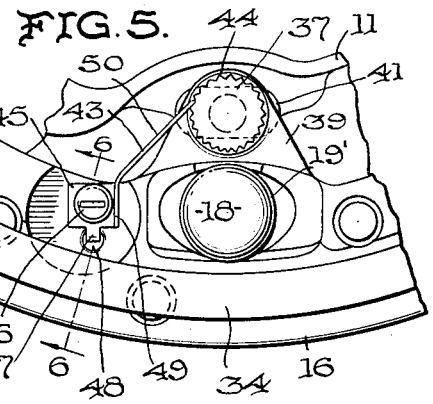
Fig. 5 is a fragmentary view in section, as taken on the line 5—5 of Fig. 4.
Figure 6:
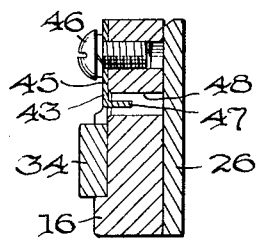
Fig. 6 is a fragmentary view in section, as taken on the line 6—6 of Fig. 5.

In accordance with the primary objective of the present invention, the brake is provided with automatic adjuster means for maintaining a predetermined release clearance as the friction lining surfaces of the brake progressively wear down during use. Such automatic adjuster means are preferably provided at diametrically opposite positions and are generally designated 35 (see Fig. 3). Referring more particularly to Figs. 4, 5 and 6, one such automatic adjuster 35 is clearly shown in detail, and it is to be understood that the other adjuster with which the brake is preferably provided will correspond thereto.

Figure 2:
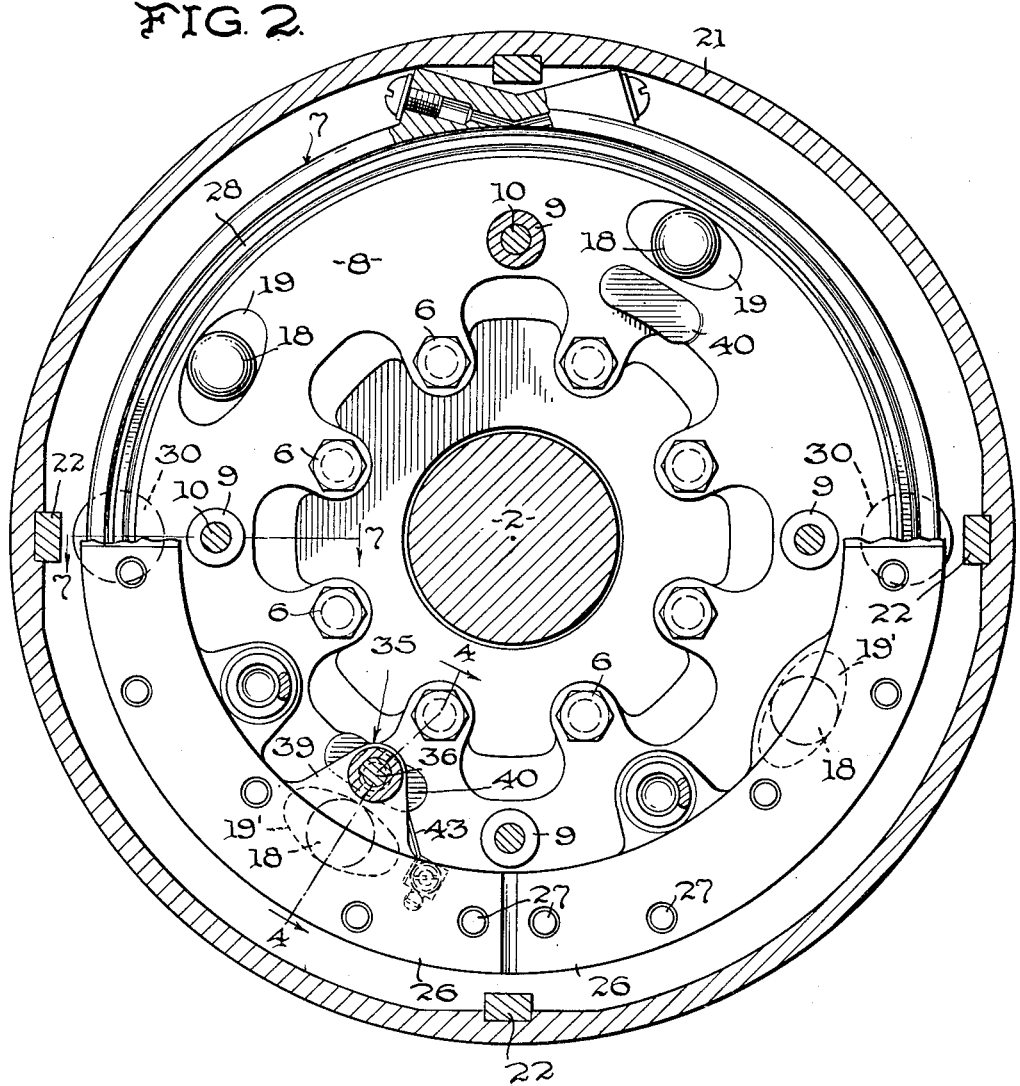
Fig. 2 is a view in vertical section, as taken on the line 2—2 of Fig. 1, showing a semi-circular portion of the actuator disc or plate in elevation, with the remaining portion of the actuator disc or plate broken away to expose the actuator mechanism for the brake.

The automatic adjusters each preferably include a one-way shiftable member 36, preferably in the form of a screw-threaded member having a head 37 thereon disposed adjacent to the plate 8, and also having a rounded lead end 38 disposed adjacent to the plate 11. The threads on the member 36 are preferably of the buttress type and have a relatively high lead angle, so that end thrust will impart rotation to the member 36. For supporting the member 36, the actuator disc or plate 16 is provided with a radially inwardly projecting screw-supporting lug 39 having a complementally threaded opening therethrough in which the screw 36 is threadly mounted, with the headed and lead ends of the screw projecting in opposite directions from the lug 39 towards the respective plates 8 and 11. The disc 8 is preferably provided with a bearing pad 40 in the form of a slight axial projection on the plate 8, the bearing projection extending slightly circumferentially, as is best illustrated in Fig. 2. At the other end of the screw 36, the plate 11 is also preferably provided with a slight axially extended bearing projection 41 for engagement with the lead end 38 of the screw, this bearing projection 41 also being slightly circumferentially extended as best illustrated in Fig. 3. The overall length of the adjuster screw 36 is slightly less than the distance between the opposed bearing projections 40 and 41, as indicated by the gap designated 42 in Fig. 4 between the lead end 38 of the screw 36 and the adjacent bearing projection 41. This gap 42 represents a predetermined release clearance for the brake, so that when the brake is disengaged, the interleaved friction discs 13 and 20 will be free for relative rotation without frictionally dragging one on the other.

Means are also provided for positively preventing rotation of the screw 36 in one direction, this means preferably being in the form of a spring detent 43 which is adapted to engage in a plurality of circumferentially spaced teeth 44 disposed about the outer periphery of the screw head 37. The spring detent 43 preferably comprises a supporting base portion 45 which is fixedly mounted upon the actuator disc or plate 16 as by means of a screw 46 or the like, and the base 45 is preferably formed with an anchor projection 47 which extends into an opening 48 in the disc or plate 16 to prevent rotative movement of the detent. Projecting outwardly from the base 45 of the detent 43 is an upstanding resilient portion 49 from which projects a resilient arm 50, the free end of the arm 50 engaging in the teeth 44 on the screw head 37.

The illustrated brake is shown in a released condition, with the rotors 20 free to rotate along with the wheel 1. When it is desired to apply the brake to retard rotation of the rotors 20 and consequently retard rotation of the wheel 1, operating fluid under pressure will be supplied to the annular actuator cylinder 29 from supply line 32, and actuator piston 28 will be shifted axially outwardly of the cylinder 29 to force the actuator plate or disc 16 towards the relatively fixed disc or plate 11. Such movement of the actuator disc or plate 16 will shift the interleaved friction discs 13 and 20 into engagement with one another between the plates 11 and 16, whereby torque will be imparted from the rotors 20 to the entire relatively stationary sub-assembly 7. The previously mentioned self-energization of the brake is accomplished when the actuator disc or plate 16 is caused to rotate slightly along with the adjacent rotor 20 relative to the power plate 8, thus causing the balls 18 to ride up the oppositely inclined ramp seats 19, 19' and positively force the actuator disc or plate 16 away from the plate 8. It will be understood, however, that in the absence of such self-energizing means, that the brake will be applied solely by the axial pressure imparted to the actuator disc or plate 16 by the annular actuator piston 28.

As the friction lining surfaces on the various discs and plates progressively wear, so that the actuator disc or plate 16 must shift progressively further towards the fixed plate 11 in order to effect engagement of the brake, the lead end 38 of the adjuster screw 36 of each automatic adjuster 35 engages the adjacent bearing projection 41 on the plate 11, and endwise pressure is applied to the respective screws 36 to cause rotation thereof with attendant axial movement of each screw 36 in a direction which will cause the headed end of each screw 36 to project further from the screw supporting lugs 39. Accordingly, release movement of the disc or plate 16 will be limited upon abutment of the screw heads 37 with the bearing pads 40 on the plate 8. The spring detent 43 positively precludes rotation of each adjuster screw 36 in a reverse direction so that endwise pressure on the screw heads 37 will not cause axial movement of the screw. In addition, the lateral pressure applied to the respective screws by the spring detent 43 precludes inadvertent or undesired rotation of the screws when the brake is released as might otherwise be caused by vibration, and such lateral pressure also precludes overrunning of the screw during brake adjustment.

It should be understood that the adjusters 35 are each operative irrespective of whether or not the brake is energized by such means as the balls 18 and ramp seats 19 and 19', but when such camming or energizing means are utilized, the bearing projections 40 and 41 provide a uniform circumferential surface for engagement with the respective opposite ends of the screws 36.

While the specific details of the invention have been herein shown and described, it is not confined thereto, since changes and alterations may be made without departing from the spirit thereof as defined in the appended claims.

I claim:

1. A friction device of the class described, comprising a pair of relatively fixed plates disposed in side-by-side spaced relation, a plurality of relatively rotatable and axially shiftable discs disposed between said plates, one of said discs constituting an axially and slightly rotatively shiftable actuator disc disposed in contiguous relation to one of said plates, actuator means for shifting the actuator disc toward the other of said plates to shift said discs toward the latter plate and into engagement with one another, camming means between said actuator disc and one of said plates for shifting the actuator disc axially towards the other plate upon slight rotation of the actuator disc relative to said plates, relatively rotatable members respectively connected to said discs to transmit torque between said relatively rotatable members, and automatic adjuster means including a one-way shiftable member disposed between said actuator disc and one of said plates for limiting axial movements in one direction of said actuator disc towards and away from the respective plates while allowing slight rotation of said actuator disc.

2. A friction device of the class described, comprising a pair of relatively fixed plates disposed in side-by-side spaced relation, a plurality of relatively rotatable and axially shiftable discs disposed between said plates, one of said discs constituting a shiftable actuator disc disposed in contiguous relation to one of said plates, actuator means for shifting the actuator disc toward the other of said plates to shift said discs toward the latter plate and into engagement with one another, relatively rotatable members respectively connected to said discs to transmit torque between said relatively rotatable members, and automatic adjuster means including a one-way shiftable member disposed between said actuator disc and one of said plates for limiting movements in one direction of said actuator disc towards and away from the respective plates, said one-way shiftable member being carried by said actuator disc and projecting therefrom towards both of said plates for engagement with the respective plates upon actuation and release of the friction device.

3. A friction device of the class described, comprising a pair of relatively fixed plates disposed in side-by-side spaced relation, a plurality of relatively rotatable and axially shiftable discs disposed between said plates, one of said discs constituting a shiftable actuator disc disposed in contiguous relation to one of said plates, actuator means for shifting the actuator disc toward the other of said plates to shift said discs toward the latter plate and into engagement with one another, relatively rotatable members respectively connected to said discs to transmit torque between said relatively rotatable members, and automatic adjuster means including a one-way shiftable member disposed between said actuator disc and one of said plates for limiting movements in one direction of said actuator disc towards and away from the respective plates, said one-way shiftable member being in the form of an adjuster screw, and said actuator disc being provided with a threaded screw support, said screw being threadedly mounted in said support and projecting axially therefrom in opposite directions for engagement with the respective plates upon actuation and release of the friction device.

4. A friction device of the class described, comprising a plurality of coaxially arranged, axially spaced members including relatively axially movable friction discs, a pair of relatively fixed plates, actuator means for shifting said friction discs axially in one direction to effect frictional engagement thereof, and automatic adjuster means for limiting movement of said discs in the opposite direction, said adjuster means including a one-way shiftable member extended axially with respect to said members and cooperatively engaged with one of said discs to limit movement thereof in said opposite direction, said last-mentioned disc being disposed adjacent to one of said plates, means supporting the latter disc on said one of the plates for relative axial and slight rotative movements, and the actuator means including self-energizing means disposed between the latter disc and plate for shifting said latter disc axially away from said one of the plates to force the other discs toward the other plate and into engagement upon slight rotation of said latter disc relative to said plates.

5. A friction device of the class described, comprising a plurality of coaxially arranged, axially spaced members including relatively axially movable friction discs, a pair of relatively fixed plates, actuator means for shifting said friction discs axially in one direction to effect frictional engagement thereof, and automatic adjuster means for limiting movement of said discs in the opposite direction, said adjuster means including a one-way shiftable member extended axially with respect to said members and cooperatively engaged with one of said discs to limit movement thereof in said opposite direction, said one-way shiftable member being carried by the last-mentioned disc and projecting axially in opposite directions towards said plates for engagement therewith at its opposite ends, the length of said one-way shiftable member being slightly less than the distance between said plates when the friction device is disengaged.

6. A friction device of the class described, comprising a plurality of coaxially arranged, axially spaced members including relatively axially movable friction discs, a pair of relatively fixed plates, actuator means for shifting said friction discs axially in one direction to effect frictional engagement thereof, and automatic adjuster means for limiting movement of said discs in the opposite direction, said adjuster means including a one-way shiftable member extended axially with respect to said members and cooperatively engaged with one of said discs to limit movement thereof in said opposite direction, said one-way shiftable member being carried by the last-mentioned disc and projecting axially in opposite directions towards said plates for engagement therewith at its opposite ends, said plates having circumferentially extended bearing surfaces for engagement with the ends of the one-way shiftable member, said last-mentioned disc being mounted for slight rotative movements relative to said plates, and the actuator means including self-energizing cam means for forcing said last-mentioned disc axially in one direction responsive to slight rotation of said disc in one direction relative to the plates, and said one-way shiftable member limiting axial movement of said disc in the opposite direction while allowing rotation of the disc in the opposite direction relative to said plates.

7. A friction device as defined in claim 5, wherein said one-way shiftable member is in the form of a screw, the last-mentioned disc having a threaded support in which said screw is mounted, and means for preventing rotation of said screw in one direction.

8. A friction device as defined in claim 5, wherein said one-way shiftable member is in the form of a screw, the last-mentioned disc having a threaded support in which said screw is mounted, and means for preventing rotation of said screw in one direction including a detent disposed adjacent to one end of the screw, and said screw having a plurality of circumferentially spaced teeth thereon engageable by said detent.

References Cited in the file of this patent

UNITED STATES PATENTS

| | | |
|---|---|---|
| 2,551,251 | Du Bois | May 1, 1951 |
| 2,563,759 | Tiscornia | Aug. 7, 1951 |